(12) United States Patent
Fink

(10) Patent No.: US 11,940,581 B2
(45) Date of Patent: Mar. 26, 2024

(54) DYNAMIC FILTER FOR SMOOTHING VELOCITY MODEL FOR DOMAIN-CONVERTING SEISMIC DATA

(71) Applicant: Landmark Graphics Corporation, Houston, TX (US)

(72) Inventor: William Fink, Highlands Ranch, TX (US)

(73) Assignee: Landmark Graphics Corporation, Houston, TX (US)

( * ) Notice: Subject to any disclaimer, the term of this patent is extended or adjusted under 35 U.S.C. 154(b) by 234 days.

(21) Appl. No.: 17/522,839

(22) Filed: Nov. 9, 2021

(65) Prior Publication Data
US 2023/0144892 A1    May 11, 2023

(51) Int. Cl.
*G01V 1/32* (2006.01)
*G01V 1/28* (2006.01)
*G01V 1/30* (2006.01)

(52) U.S. Cl.
CPC .............. *G01V 1/325* (2013.01); *G01V 1/282* (2013.01); *G01V 1/303* (2013.01)

(58) Field of Classification Search
CPC ......... G01V 1/325; G01V 1/282; G01V 1/303
See application file for complete search history.

(56) References Cited

U.S. PATENT DOCUMENTS

| | | | |
|---|---|---|---|
| 6,778,909 B1 | 8/2004 | Popovici et al. | |
| 7,493,241 B2* | 2/2009 | Lee | G01V 1/303 703/2 |
| 8,363,509 B2* | 1/2013 | Colombo | G01V 11/00 367/73 |
| 8,612,156 B2* | 12/2013 | Gulati | G01V 1/301 702/14 |
| 2002/0141287 A1 | 10/2002 | Azaratos | |
| 2012/0215501 A1 | 8/2012 | Mnje et al. | |
| 2015/0030210 A1 | 1/2015 | Matson | |
| 2021/0047917 A1 | 2/2021 | Hornby et al. | |

OTHER PUBLICATIONS

PCT Application No. PCT/US2021/058672, "International Search Report and Written Opinion", dated Jul. 26, 2022, 11 pages.

* cited by examiner

*Primary Examiner* — Elias Desta
(74) *Attorney, Agent, or Firm* — Kilpatrick Townsend & Stockton LLP

(57) ABSTRACT

A system can be provided for applying a dynamic filter to a velocity model for converting the domain of seismic data. The system can receive a velocity model for a geological area of interest. The system can apply a dynamic filter to the velocity model for smoothing an anomaly included in the velocity model. The system can apply the velocity model with the smoothed anomaly to seismic data associated with the geological area of interest for converting the domain of the seismic data.

20 Claims, 5 Drawing Sheets

DYNAMIC FILTER FOR SMOOTHING VELOCITY MODEL FOR DOMAIN-CONVERTING SEISMIC DATA

TECHNICAL FIELD

The present disclosure relates generally to well exploration and, more particularly (although not necessarily exclusively), to domain conversion of seismic data associated with a subterranean formation.

BACKGROUND

A wellbore can be formed in a subterranean formation for extracting produced hydrocarbon or other suitable material. Determining a position for the wellbore can involve performing one or more measurements relating to the subterranean formation. For example, velocity data (e.g., velocity of the speed of sound or of seismic waves) can be gathered with respect to the subterranean formation. The velocity data can be used to determine properties (e.g., lithology, formation components, depth data etc.) of the subterranean formation. With standard time processing, anomalies in the velocity data can cause incorrect depth data and other related incorrect data to be used. The incorrect depth data may cause an inaccurate drilling map or other suitable wellbore formation plan to be inaccurate. The inaccurate drilling map may cause the wellbore to be formed at a sub-optimal location, using sub-optimal drilling parameters, and may cause other undesirable effects (e.g., safety concerns) when exploring the subterranean formation or forming the wellbore.

DETAILED DESCRIPTION

Figure 1:
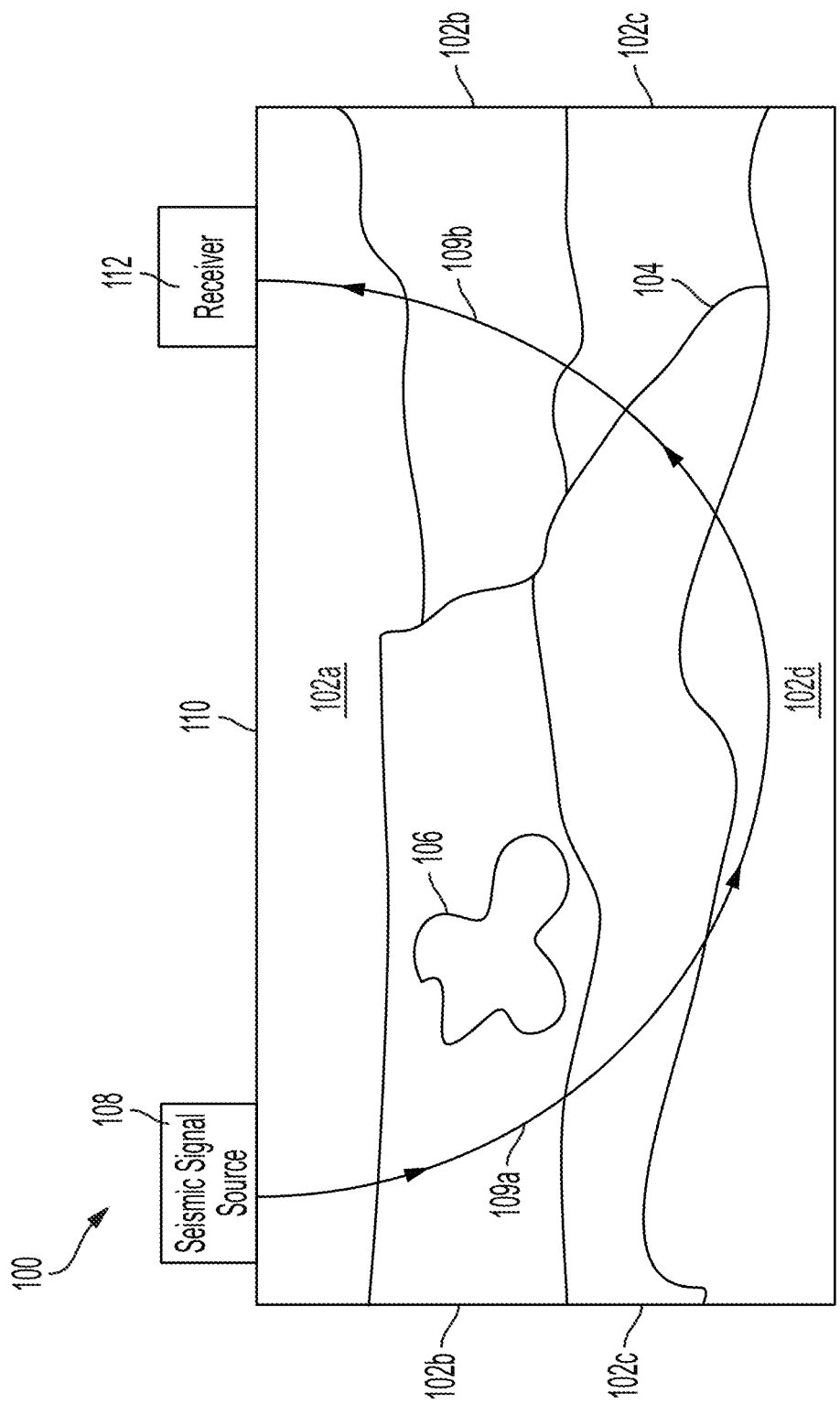
FIG. 1 is a sectional side-view of a subterranean formation having seismic data for which a domain conversion can be performed using a velocity model smoothed with a dynamic filter according to one example of the present disclosure.

Certain aspects and examples of the present disclosure relate to smoothing a velocity model, with a dynamic filter, of a geological area of interest for performing domain conversions of seismic data associated with the geological area of interest. The geological area of interest may include a subterranean formation, a portion of the subterranean formation, or may be included in the subterranean formation. The velocity model can include a three-dimensional model, which can include seismic wave velocities, of the geological area of interest. The dynamic filter can be any suitably shaped filter that can smooth anomalies (e.g., anomalies as the velocity values change laterally due to lateral velocity anomalies) in the velocity model. Some examples of shapes for the dynamic filter can include a cone, a quadrilateral, a composite shape, or other suitable shape for the dynamic filter. The domain conversions of the seismic data can involve converting the seismic data from time data to depth data or other suitable domain conversions. The dynamic filter can be applied to the velocity model. For example, each XY-time location of the velocity model can correspond to a different (e.g., with respect to size, shape, etc. of the dynamic filter) dynamic filter that can domain-convert (e.g., from time-domain to depth-domain) the seismic data. The domain-converted seismic data can be used in various wellbore operations such as hydrocarbon exploration operations. The operations can include determining a location for a wellbore, determining a drilling plan for forming the wellbore, or other suitable wellbore operations.

Accurate domain conversion of seismic time data to seismic depth data can involve various challenges. Though it is possible to use depth migrated velocities, lateral velocity contrasts in the model may include effects at some or all depths in a domain conversion. Domain conversions that perform vertical integration of the velocity model can introduce false structures under areas of lateral velocity contrast, for example, under faults or under edges of salt bodies in a geological area of interest. The false structures can include fault shadows, salt shadows, or other types of false structures or anomalies. The false structures, or other related anomalies in the velocity model for example, can be caused by seismic acquisition "undershoots" of the lateral velocity anomalies with respect to depth due to increased source offsets, receiver offsets, other suitable sources, or a combination thereof.

A dynamic filter can be used to address the false structures or other anomalies. The dynamic filter can dampen distortion effects of lateral velocity changes during domain conversion. The filtered domain conversion can include lateral velocity information in its vertical integration of the velocity model, and, accordingly, can account for undershooting of seismic acquisition data. Additionally, the dynamic filter can vary with respect to depth, to time, to other suitable parameters associated with the seismic data or velocity model, or to a combination thereof. By using the dynamic filter to smooth the velocity models, the velocity models can correct horizons that are below the fault shadow and can correct distortion effects of shallow velocity anomalies, and can correct other suitable or related anomalies in the velocity models. Accordingly, the dynamic filter may allow for more accurate depth maps (e.g., compared to velocity models not smoothed or otherwise corrected by the dynamic filter) to be generated. The more accurate depth maps may allow improved well targeting and other improved analyses (e.g., compared to analyses conducted using velocity models not smoothed with the dynamic filter) with respect to wellbore operations.

Various types or shapes of filters can be used to vertically integrate the velocity model for smoothing the velocity model. For example, a filter that ray-traces through the velocity model and integrates velocities within a predetermined angle range can be used. The integration, in this example, can include distance-weighted via standard weighting algorithms (e.g., Gaussian, Uniform, $$\frac{1}{r}, \frac{1}{r^2},$$

etc., in which r is a distance from a central point of the filter). Additionally, a filter that integrates the velocities within a predetermined radius in which the radius can be geometrically defined at each filter depth or filter time can be used. Using the predetermined angle range or the predetermined radius can allow the vertical ray-traced velocity to be based on the velocities within an area or volume represented by the filters. The area of the filters can grow and can widen as the time associated with the domain conversion increases. The vertical ray-traced domain conversion velocities can be based on the area of the seismic acquisition undershooting. In some examples, the filter can be or otherwise include a three-dimensional dynamic or modular filter usable to smooth a velocity model of a geological area of interest of a subterranean formation.

A tool can be used that can filter an existing domain conversion velocity model into a seismic-acquisition-undershooting velocity model. Various parameter settings can be adjusted to select how the filter changes in three dimensions with respect to depth or other suitable seismic parameters. The resultant dynamic filter velocity model may not be a geologic velocity model since the incremental velocities (as depth increases) may be adjusted or filtered such that the domain conversion would be as if the ray-tracing went through a geometrically smoothed version of the original velocity model. The filtered velocity model can be used for domain conversion within a geophysical interpretation, a geological interpretation, or a combination thereof, for example, within software. The undershot velocity model may improve domain conversion accuracy (e.g., as compared to velocity models that are not smoothed using the filter) in velocity shadow zones.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a sectional side-view of a subterranean formation 100 having seismic data for which a domain conversion can be performed using a velocity model smoothed with a dynamic filter according to one example of the present disclosure. In some examples, one or more exploration-related operations (e.g., hydrocarbon exploration, generating drilling maps, etc.) can be performed with respect to the subterranean formation 100 or with respect to a geological area of interest included in the subterranean formation 100, etc. The subterranean formation 100 can include various earth strata 102a-d, which can each include similar or varying lithologies. For example, the strata 102a and the strata 102c can include sandstone, the strata 102b can include granite, and the strata 102d can include a mixture of sandstone and gas, etc. The subterranean formation 100 can include other suitable amounts or types of strata 102, and the strata 102a-d can include any suitable lithologies, depths, and the like.

The subterranean formation 100 may additionally include various geological features. For example, the geological features can include zero or more faults, zero or more salt bodies, or other suitable or related geological features. As illustrated, the subterranean formation 100 includes a fault 104 and a salt body 106, but the subterranean formation 100 can include other suitable amounts of faults, salt bodies, or other suitable geological features.

One or more exploration operations can be performed with respect to the subterranean formation 100. For example, a hydrocarbon exploration operation to determine a location (e.g., depth, etc.) of a future wellbore or to generate a drilling map for the subterranean formation 100 (or any geological area of interest thereof) can be performed with respect to the subterranean formation 100. In this example, a seismic signal source 108 can be positioned at a surface 110 of the subterranean formation 100. The seismic signal source 108 can be any suitable source material (e.g., explosives) or generator that can generate seismic source signals 109a such as seismic waves. In some examples, the seismic signal source 108 can include any suitable source that can generate and direct sound waves into the subterranean formation 100 for measuring one or more parameters of the subterranean formation 100. The seismic source signals 109a can be directed from the seismic signal source 108 into the subterranean formation 100. For example, the seismic signal source can include explosives, and the explosives can be detonated to cause the seismic source signals 109a to be generated and to be directed into the subterranean formation 100.

In some examples, the seismic source signals 109a can scatter or otherwise travel through one or more of the strata 102a-d, which can generate received seismic signals 109b. The received seismic signals 109b can be received at a receiver 112 that may be positioned at the surface 110 of the subterranean formation 100. The receiver 112 can be positioned in any other suitable location with respect to the subterranean formation 100 and can include any suitable receiver that can detect seismic signals such as seismic waves or sound waves.

The receiver 112 may be communicatively coupled to a computing device 140. In some examples, the receiver 112 can communicate with, or otherwise transmit data to, the computing device 140 through a separate device such as a recording device. The computing device 140 can be positioned at the surface 110 of the subterranean formation 100 or in other suitable locations (e.g., underground, offsite, etc.) with respect to the subterranean formation 100. The receiver 112 can be communicatively coupled to the computing device 140 via a wired connection or via a wireless connection (e.g., through Bluetooth®, WiFi™, etc.).

The receiver 112 can receive the seismic signals 109b and can generate seismic data. In some examples, the receiver 112 can transmit the seismic signals 109b, or an electronic or digital representation thereof, to the computing device 140 for generating the seismic data. In some examples, the receiver 112 may receive the seismic signals 109b, may transmit the seismic signals 109b to the recording device for generating recorded seismic signals or seismic data, and the recording device may transmit recorded seismic signals or data to the computing device 140. The seismic data can include a velocity model that includes a velocity of the seismic signals 109a-b in the subterranean formation 100 or other suitable information. In some examples, the seismic data can alternatively be used to generate the velocity model. The velocity model, which may include a three-dimensional representation of velocities of the seismic signals 109a-b or other suitable data, can be generated or otherwise received via any other suitable techniques.

The velocity model may include the velocity data, or other suitable data related to the subterranean formation 100, that may include a time-domain. For example, the velocity model, or data thereof, may be expressed as a function of time. The time-based data can be recorded by the receiver 112 and can be transmitted to the computing device 140.

Performing exploration operations (e.g., generating the drilling map) can involve converting the time-based data to depth-based data. The computing device 140, or other suitable computer or computing system, can perform a domain conversion using the velocity model to transform the domain from time-based data to depth-based data.

Lateral velocity anomalies (e.g., anomalies in the velocity model and associated with geological features such as the fault 104 or the salt body 106) can cause other domain conversions (e.g., one-dimensional velocity integration, and the like) to be inaccurate. For example, domain-converting in the presence of lateral velocity anomalies may cause at least some of the depth-data to be inaccurate, which can cause the drilling map, or other suitable results of exploration operations, to be inaccurate. Using inaccurate drilling maps can cause various undesirable effects during formation of a wellbore. For example, a high-pressure feature in the subterranean formation 100 may be unknowingly accessed, which can cause a blowout or other related safety hazard. Additionally, a drilling target depth may be missed (e.g., the wellbore may not be formed deep enough), which can result in an unproductive well.

The computing device 140 can use a dynamic filter to address or otherwise correct for the lateral velocity anomaly distortions. For example, the dynamic filter can be shaped to include additional data from the velocity model for use in integration. The additional data can allow the computing device 140 to perform a three-dimensional integration, or other suitable operation, for performing the domain of seismic data associated with the subterranean formation 100 from time-based data to depth-based data. Additionally, the filter may be dynamic in which the computing device 140 may use different sizes, shapes, and the like of the dynamic filter at different time-intervals or different depth-intervals of the domain conversion. Using the dynamic filter may allow the computing device 140 to generate more accurate drilling maps or drilling plans (e.g., compared to drilling maps or drilling plans generated by computing devices not using the dynamic filter) for use in forming a wellbore.

Figure 2:
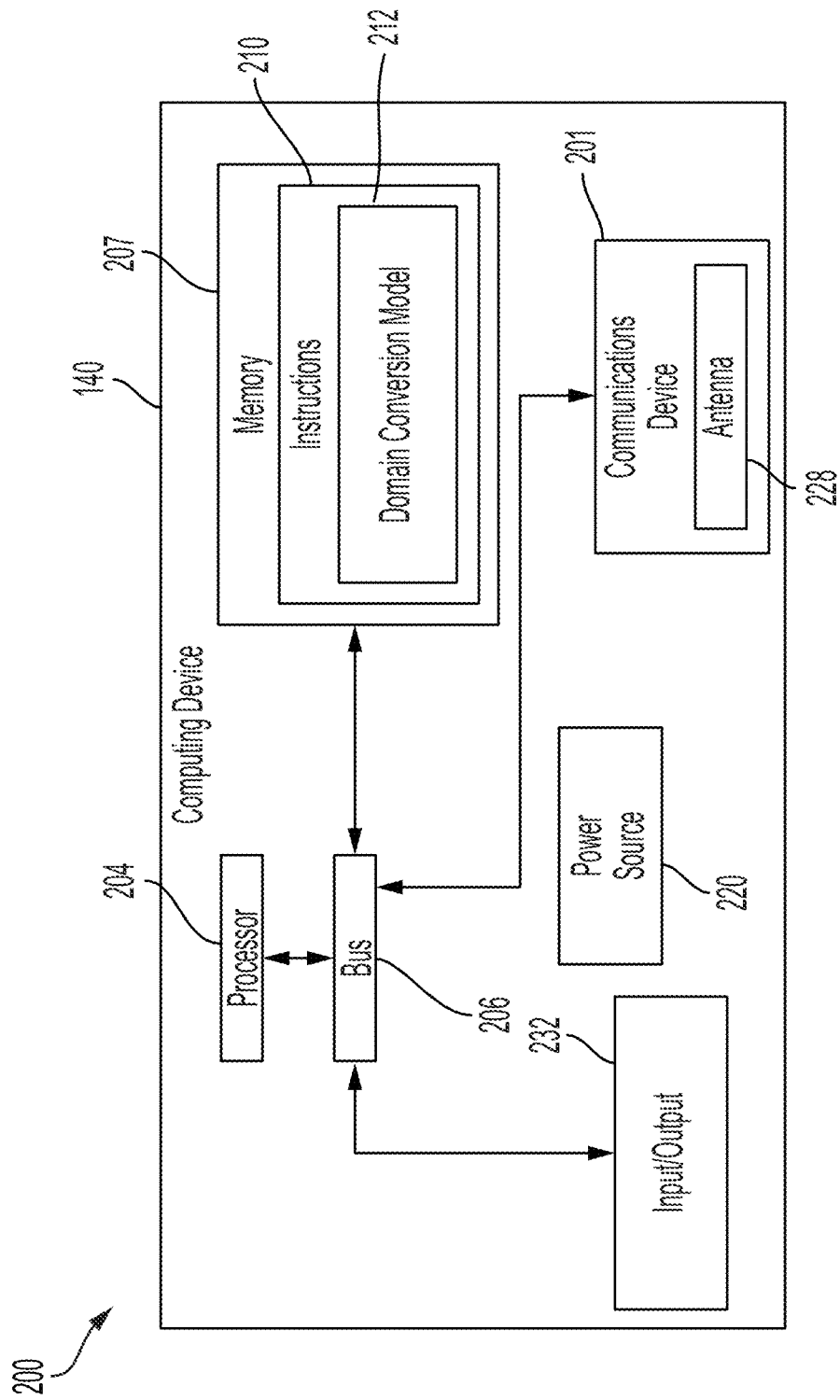
FIG. 2 is a block diagram of a computing system for applying a dynamic filter to a velocity model for performing a domain conversion on seismic data according to one example of the present disclosure.

FIG. 2 is a block diagram of a computing system 200 for applying a dynamic filter to a velocity model for performing a domain conversion on seismic data according to one example of the present disclosure. The components shown in FIG. 2, such as the processor 204, memory 207, power source 220, communications device 201, and the like, may be integrated into a single structure, such as within a single housing, of a computing device 140. Alternatively, the components shown in FIG. 2 can be distributed from one another and in electrical communication with each other.

The computing system 200 may include the computing device 140. The computing device 140 can include a processor 204, a memory 207, and a bus 206. The processor 204 can execute one or more operations for applying a dynamic filter to smooth a velocity model for a domain conversion of seismic data associated with the subterranean formation 100. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 may include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions 210 for smoothing a velocity model for converting the domain of seismic data. For example, the computer program instructions 210 can include a domain conversion model 212 that can be executed by the processor 204 for causing the processor 204 to perform various operations. For example, the domain conversion model 212 can cause a dynamic filter to be applied to a velocity model associated with the subterranean formation 100 for smoothing or otherwise correcting distortions caused by lateral velocity anomalies. The domain conversion model 212 can additionally apply the smoothed velocity model to seismic data associated with the subterranean formation 100 for converting the domain of the seismic data. The domain conversion model 212 can perform other suitable tasks with respect to converting the domain of seismic data associated with the subterranean formation 100.

The computing device 140 can include a power source 220. The power source 220 can be in electrical communication with the computing device 140 and the communications device 201. In some examples, the power source 220 can include a battery or an electrical cable (e.g., a wireline). The power source 220 can include an AC signal generator. The computing device 140 can operate the power source 220 to apply a transmission signal to the antenna 228 to generate electromagnetic waves that convey data relating to the subterranean formation 100, the domain conversion model 212, etc., to other systems. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

In some examples, a subset of the communications device 201 can be implemented in software. For example, the communications device 201 can include additional instructions stored in memory 207 for controlling functions of the communication device 201. The communications device 201 can receive signals from remote devices and transmit data to remote devices. For example, the communications device 201 can transmit wireless communications that are modulated by data via the antenna 228. In some examples, the communications device 201 can receive signals (e.g. associated with data to be transmitted) from the processor 204 and amplify, filter, modulate, frequency shift, or otherwise manipulate the signals. In some examples, the communications device 201 can transmit the manipulated signals to the antenna 228. The antenna 228 can receive the manipulated signals and responsively generate wireless communications that carry the data.

The computing device 140 can additionally include an input/output interface 232. The input/output interface 232 can include or otherwise connect to a keyboard, pointing device, display, other computer input/output devices, or a combination thereof. An operator may provide input using the input/output interface 232. Data, such as seismic data, data relating to the velocity model, etc., relating to the subterranean formation 100 can be displayed to an operator or other suitable individual via a display that is connected to or is part of the input/output interface 232. The displayed values can be displayed to the operator, or to a supervisor, of one or more wellbore operations or exploration operations associated with the subterranean formation 100.

Figure 3:
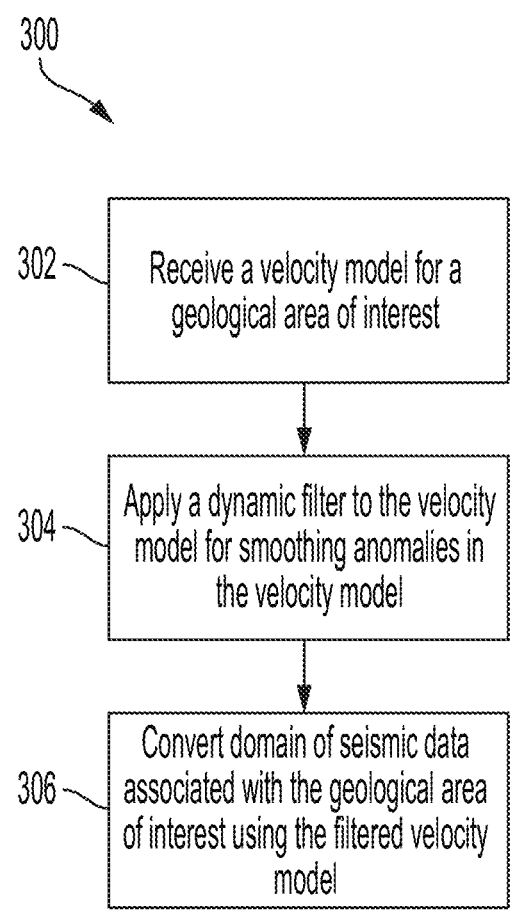
FIG. 3 is a flowchart of a process to apply a dynamic filter to a velocity model of a geological area of interest for performing a domain conversion on seismic data according to one example of the present disclosure.

FIG. 3 is a flowchart of a process 300 to apply a dynamic filter to a velocity model of a geological area of interest for performing a domain conversion on seismic data according to one example of the present disclosure. At block 302, the computing device 140 receives a velocity model associated with a geological area of interest. The geological area of interest may be, may include, or may be included in the subterranean formation 100. The velocity model may be derived from a set of seismic data or other suitable data that may include velocity values (e.g., of the seismic signals 109*a-b*) expressed as a function of time or other suitable type of domain. In some examples, the velocity model can be generated (e.g., by the computing device 140 or other suitable computer or computing system) based on the seismic data associated with the subterranean formation 100.

At block 304, the computing device 140 applies a dynamic filter to the velocity model of the geological area of interest for smoothing anomalies in the velocity model. The computing device 140 may determine or otherwise generate the filter dynamically. For example, at a first time value or interval of the velocity model, the dynamic filter may include a first shape and a first size, and at a second time value or interval (e.g., after the first time interval), the dynamic filter may include a second shape, a second size, or a combination thereof. In some examples, the computing device 140 can interpolate one or more dynamic filters for time values of the velocity model between the first time and the second time.

Applying the dynamic filter may involve vertically integrating velocity values (or other suitable values) within the dynamic filter. In some examples, the integration path associated with the dynamic filter can be predefined and may depend on the shape of the dynamic filter. The dynamic filter may be defined (e.g., manually or automatically) at predetermined times (e.g., four different dynamic filters can be defined at four corresponding times identified in the velocity model, and the computing device 140 can dynamically interpolate new filters at the times between the defined filters). The dynamic filter can be applied any suitable amount of times to the velocity model for smoothing the anomalies, which can include lateral velocity anomalies associated with geological features (e.g., the fault 104, the salt body 106, or the like) of the subterranean formation 100. In some examples, by applying the dynamic filter to the velocity model, the anomalies (e.g., the lateral velocity anomalies, etc.) of the velocity model can be smoothed with a unique filter at every XY and Z location in the subterranean formation 100.

In some examples, the computing device 140 can determine the shape, the size, and other suitable parameters of the dynamic filter. For example, the computing device 140 can determine that shape of the dynamic filter can be three-dimensional and can include a cross-section such as a quadrilateral, a cone, a conic section, a composite shape, or other suitable cross-section shape. The computing device 140 can receive (e.g., from a user or other suitable entity associated with the subterranean formation 100) one or more filter parameters. The filter parameters can include an angle, lateral extents, a size or depth (e.g., a maximum depth), a time interval or amount of time intervals, an integration path (e.g., parabolic) or other suitable filter parameters. The computing device 140 can use the filter parameters to generate the dynamic filter. For example, the computing device 140 can receive the angle of the dynamic filter and can generate a uniquely shaped filter at every depth location in the subterranean formation 100. In some examples, the computing device 140 can receive the filter parameters and generate the dynamic filter for each time interval of the velocity model.

The dynamic filter can be or represent various shapes, sizes, at various depths, etc. For example, the dynamic filter can be cone-shaped, rectangular-shaped, parabola-shaped, or other suitable shapes for the dynamic filter. Additionally, the dynamic filter can include more than one shape at various time intervals. For example, the dynamic filter can include a piece-wise or composite shape that includes one or more cones, one or more quadrilaterals, one or more parabolas, or other suitable shapes. The shape, or the shapes, of the dynamic filter can be determined by the computing device 140, for example, based on the received filter parameters. Additionally, the size of the dynamic filter can be determined by the computing device 140, for example, based on a depth or time interval parameter received by the computing device 140.

At block 306, the computing device 140 applies the smoothed velocity model to seismic data associated with the geological area of interest for converting a domain of the seismic data. The computing device 140 can use the smoothed velocity model to perform one or more domain conversions. For example, the computing device 140 can convert the seismic data from time-based data to depth-based data. The computing device 140 can perform any other suitable domain conversion operations on seismic interpretation data (e.g., seismic horizons or seismic faults) with respect to the subterranean formation 100.

In some examples, the domain-converted seismic data can be used in one or more exploration operations or other similar operations with respect to the subterranean formation 100. For example, the domain-converted seismic data can be used to generate one or more drilling maps or drilling plans that can be used to form a wellbore in the subterranean formation 100. The domain-converted seismic data may allow the drilling maps or the drilling plans to be more accurate (e.g., than drilling maps or drilling plans using seismic data not domain-converted using the smoothed velocity model), which can improve formation of the wellbore.

Figure 4:
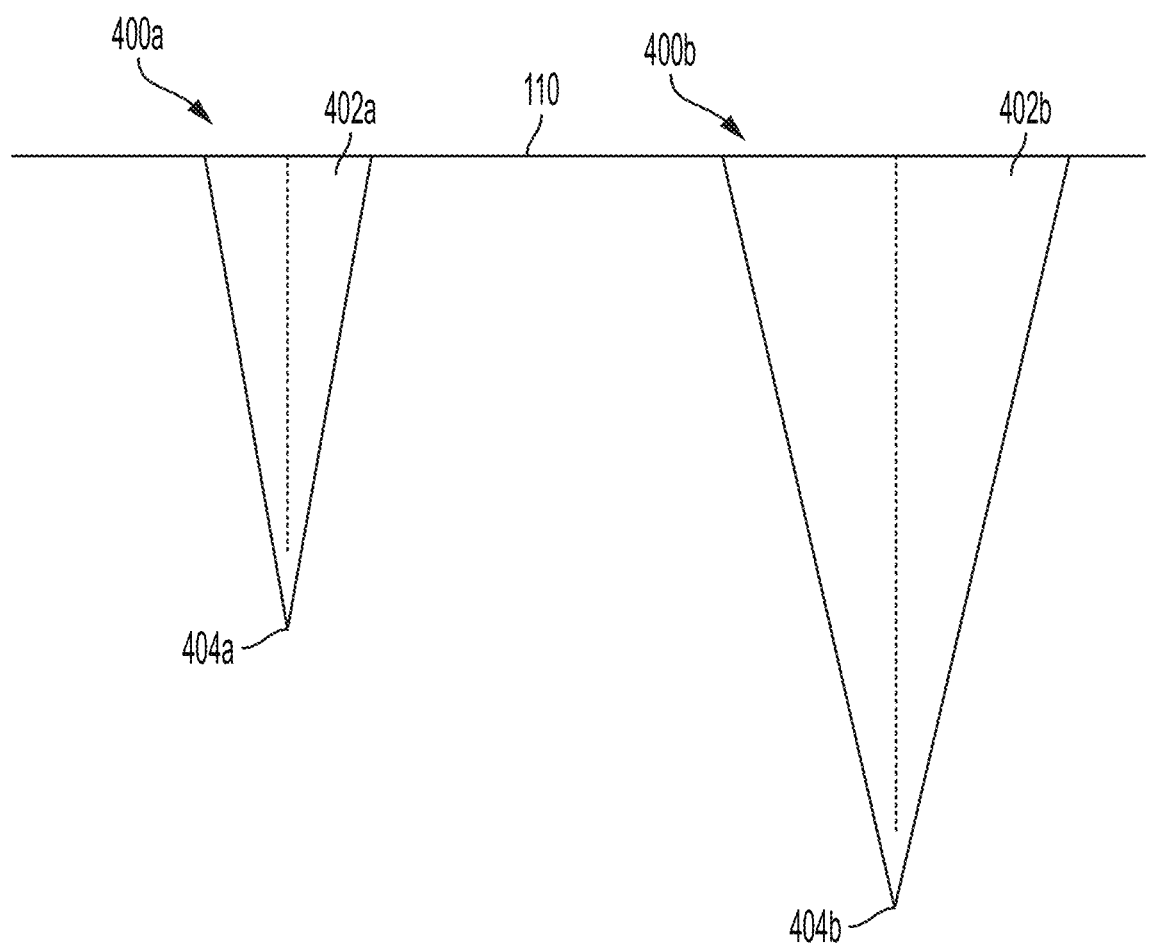
FIG. 4 is an example of a dynamic filter usable to smooth a velocity model for a domain conversion of seismic data according to one example of the present disclosure.

FIG. 4 is an example of dynamic filters 400*a-b* usable to smooth a velocity model for a domain conversion of seismic data according to one example of the present disclosure. As illustrated, the filters 400*a-b* include a shape (or cross-section) of a three-dimensional cone, but the shape or cross-section of the filters 400*a-b* can include any other suitable shape for the dynamic filter algorithm. In some examples, the computing device 140 can interpolate one or more dynamic filters between the dynamic filters 400*a-b* at every XY and Z location of the velocity model or the subterranean formation 100. As illustrated in FIG. 4, the vertical direction and the horizontal direction may correspond to a position (e.g., depth, etc.) in the subterranean formation 100.

In some examples, the dynamic filters 400a-b can include parameterizations. The dynamic filter parameterization 400a may be generated by the computing device 140 for a first time associated with the velocity model, and the dynamic filter parameterization 400b may be generated by the computing device 140 for a second (e.g., deeper) time. The filter parameters for the shapes of the dynamic filters 400a-b may be different. For example, a first depth parameter associated with the dynamic filter 400a may be different than (e.g., smaller than) a second depth parameter associated with the dynamic filter 400b. The dynamic filter parameterizations 400a-b may include any other suitable filter parameters, which may be similar or different.

The computing device 140 may use the dynamic filter parameterizations 400a-b to smooth the velocity model. For example, the computing device 140 can apply the dynamic filter 400a to seismic data at the first time and then apply dynamically interpolated filters to the seismic data until the time of the dynamic filter 400b is reached. Interpolated dynamic filters between the dynamic filters 400a-b can be applied using any other suitable technique. In some examples, applying the interpolated dynamic filters can include vertically integrating data included in a volume (e.g., volume 402a-b), which may extend from depths (e.g., maximum depths 404a-b) to the surface 110 of the subterranean formation 100. The computing device 140 applies the dynamic filters 400a-b for smoothing the velocity model from surface 110 to the bottom of formation 102. In some examples, the vertically integrated data may correspond to the geological location or area of interest of the subterranean formation 100 represented by the dynamic filter parameterizations 400a-b.

Figure 5:
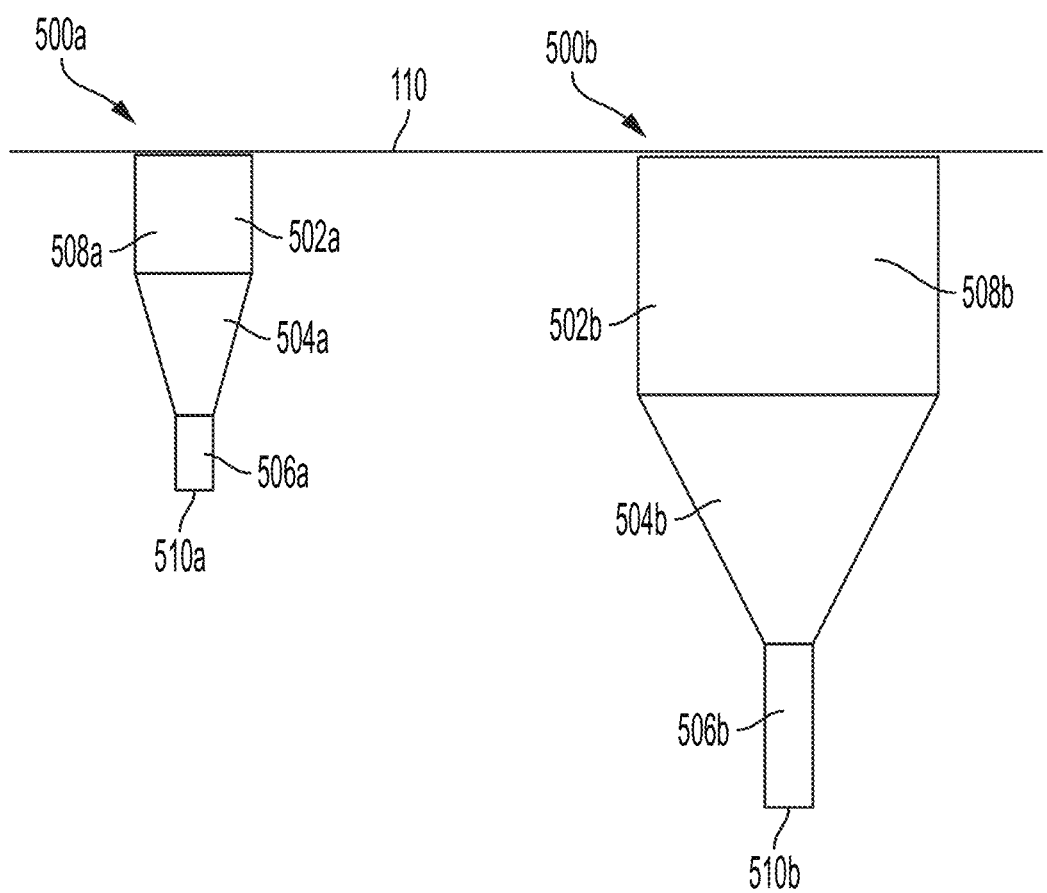
FIG. 5 is another example of a dynamic filter usable to smooth a velocity model for a domain conversion of seismic data according to one example of the present disclosure.

FIG. 5 is an example of an alternative dynamic filter parameterizations 500a-b usable to smooth a velocity model for a domain conversion of seismic data according to one example of the present disclosure. As illustrated, the dynamic filter parameterizations 500a-b include a composite shape that includes set of shapes including rectangles 502a-b, trapezoids 504a-b, and rectangles 506a-b, but the shape of the base filters 500a-b can include any other suitable shape for the dynamic filter parameterizations 500a-b. The dynamic filters based on the parameterizations 500a-b may be generated by the computing device 140, for example, in response to receiving filter parameters. As illustrated in FIG. 5, the vertical direction and the horizontal direction may correspond to a position (e.g., depth, etc.) in the subterranean formation 100.

The dynamic filter 500a may be generated by the computing device 140 for a first time, and then the computing device 140 can dynamically interpolate filters until the time value associated with the dynamic filter 500b is reached. The filter parameters for the dynamic filters 500a-b may be different. For example, a first depth parameter associated with the dynamic filter 500a may be different than (e.g., smaller than) a second depth parameter associated with the dynamic filter 500b. The dynamic filter parameterizations 500a-b may include any other suitable filter parameters, which may be similar or different. For example, the received filter parameters may cause the computing device 140 to generate a similar set of shapes (that can be of any suitable size) for each time interval. But, the set of shapes may not be similar among the time intervals and may vary in amount, shape types, and the like.

The composite nature of the dynamic filter parameterization 500a-b may be caused by, or otherwise generated in response to, weighting parameters received by the computing device 140. For example, the computing device 140 can receive a first weight applicable to a first shape (e.g., the rectangles 502a-b), a second weight applicable to a second shape (e.g., the trapezoids 504a-b), and a third weight applicable to a third shape (e.g., the rectangles 506a-b). The computing device 140 can receive any other suitable amount of weighting parameters, which can cause the size of a subset of the dynamic filters generated from the parameterization of the dynamic filters 500a-b to vary, for example, with respect to depth.

The computing device 140 may use the dynamic filters generated from parameterization to smooth the velocity model. For example, the computing device 140 can apply the dynamic filter 500a to seismic data at the first time sample and then apply interpolated dynamic filters to the following time samples, until the time value associated with the dynamic filter 500b is reached. The interpolated dynamic filters and the dynamic filters 500a-b (e.g., from parameterization) can be applied using any other suitable technique. In some examples, applying interpolated dynamic filters derived from the dynamic filter parameterizations 500a-b can include vertically integrating data included in a volume (e.g., volume 508a-b), which may extend from depths (e.g., maximum depths 510a-b) to the surface 110 of the subterranean formation 100. In some examples, the computing device 140 can apply dynamic filters (e.g., the dynamic filter parameterizations 500a-b) for smoothing the velocity model from surface 110 to the bottom of formation 102.

In some aspects, systems, methods, and non-transitory computer-readable mediums for applying a dynamic filter to a velocity model for domain conversion of seismic data are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving a velocity model for a geological area of interest; applying a dynamic filter to the velocity model for smoothing an anomaly included in the velocity model; and applying the velocity model with the smoothed anomaly to seismic data associated with the geological area of interest for converting a domain of the seismic data.

Example 2 is the system of example 1, wherein the operations further comprise: receiving a plurality of filter parameters; and generating, based on the plurality of filter parameters, the dynamic filter.

Example 3 is the system of any of examples 1-2, wherein the filter parameters include an amount of time intervals, a maximum depth, and an integration path.

Example 4 is the system of example 1, wherein the dynamic filter is a first dynamic filter, and wherein the operation of applying the dynamic filter includes: applying the first dynamic filter in a first time of the velocity model; and applying a second, interpolated dynamic filter to a subsequent position and time value of the velocity model.

Example 5 is the system of example 1, wherein the operation of applying the dynamic filter includes integrating the velocity model along a predefined integration path within the dynamic filter, and wherein the predefined integration path is determined based on a shape of the dynamic filter.

Example 6 is the system of example 1, wherein a shape of the dynamic filter is three-dimensional, and wherein a cross-section of the shape includes a cone, a conic section, a quadrilateral, or a composite shape.

Example 7 is the system of example 1, wherein the velocity model is a three-dimensional velocity model, wherein the three-dimensional velocity model includes velocity data for seismic signals in the geological area of interest, wherein the operation of applying the dynamic filter to the velocity model includes using the dynamic filter to three-dimensionally integrate the three-dimensional velocity model for smoothing lateral anomalies, and wherein the operation of applying the velocity model to the seismic data includes applying the three-dimensional velocity model to the seismic data to convert the domain of the seismic data from a time domain to a depth domain.

Example 8 is a method comprising: receiving a velocity model for a geological area of interest; applying a dynamic filter to the velocity model for smoothing an anomaly included in the velocity model; and applying the velocity model with the smoothed anomaly to seismic data associated with the geological area of interest for converting a domain of the seismic data.

Example 9 is the method of example 8, further comprising: receiving a plurality of filter parameters; and generating, based on the plurality of filter parameters, the dynamic filter.

Example 10 is the method of any of examples 8-9, wherein the filter parameters include time values, lateral extents, a maximum depth, and an integration weighting function.

Example 11 is the method of example 8, wherein the dynamic filter is a first dynamic filter, and wherein applying the dynamic filter includes: applying the first dynamic filter at a first time of the velocity model; and applying a second, interpolated dynamic filter to a subsequent time and position value of the velocity model.

Example 12 is the method of example 8, wherein applying the dynamic filter includes integrating the velocity model along a predefined integration weighting function within the dynamic filter, and wherein the predefined integration weighting function is determined based on a shape of the dynamic filter.

Example 13 is the method of example 8, wherein a shape of the dynamic filter is three-dimensional, and wherein a cross-section of the shape includes a cone, a conic section, a quadrilateral, or a composite shape.

Example 14 is the method of example 8, wherein the velocity model is a three-dimensional velocity model, wherein the three-dimensional velocity model includes velocity data for seismic signals in the geological area of interest, wherein applying the dynamic filter to the velocity model includes using the dynamic filter to three-dimensionally integrate the three-dimensional velocity model for smoothing the anomaly, and wherein applying the velocity model to the seismic data includes applying the three-dimensional velocity model to the seismic data to convert the domain of the seismic data from a time domain to a depth domain.

Example 15 is a non-transitory computer-readable medium comprising instructions that are executable by a processing device for causing the processing device to perform operations comprising: receiving a velocity model for a geological area of interest; applying a dynamic filter to the velocity model for smoothing an anomaly included in the velocity model; and applying the velocity model with the smoothed anomaly to seismic data associated with the geological area of interest for converting a domain of the seismic data.

Example 16 is the non-transitory computer-readable medium of example 15, wherein the operations further comprise: receiving a plurality of filter parameters that include an specific times, specific lateral extents, a maximum depth, and an integration weighting function; and generating, based on the plurality of filter parameters, the dynamic filter.

Example 17 is the non-transitory computer-readable medium of example 15, wherein the dynamic filter is a first dynamic filter, and wherein the operation of applying the dynamic filter includes: applying the first dynamic filter to a first time of the velocity model; and applying a second, interpolated dynamic filter to a subsequent time and position value of the velocity model.

Example 18 is the non-transitory computer-readable medium of example 15, wherein the operation of applying the dynamic filter includes integrating the velocity model along a predefined integration weighting function within the dynamic filter, and wherein the predefined integration weighting function is determined based on a shape of the dynamic filter.

Example 19 is the non-transitory computer-readable medium of example 15, wherein a shape of the dynamic filter is three-dimensional, and wherein a cross-section of the shape includes a cone, a conic section, a quadrilateral, or a composite shape.

Example 20 is the non-transitory computer-readable medium of example 15, wherein the velocity model is a three-dimensional velocity model, wherein the three-dimensional velocity model includes velocity data for seismic signals in the geological area of interest, wherein the operation of applying the dynamic filter to the velocity model includes using the dynamic filter to three-dimensionally integrate the three-dimensional velocity model for smoothing the anomaly, and wherein the operation of applying the velocity model to the seismic data includes applying the three-dimensional velocity model to the seismic data to convert the domain of the seismic data from a time domain to a depth domain.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a processor; and
    a non-transitory computer-readable medium comprising instructions that are executable by the processor to cause the processor to perform operations comprising:
        receiving a velocity model for a geological area of interest;
        applying a dynamic filter to the velocity model for smoothing an anomaly included in the velocity model, wherein a shape of the dynamic filter is variable with respect to absolute depth; and
        applying the velocity model with the smoothed anomaly to seismic data associated with the geological area of interest for converting a domain of the seismic data.

2. The system of claim 1, wherein the operations further comprise:
    receiving a plurality of filter parameters that includes an amount of time intervals, a maximum depth, and an integration path; and generating, based on the plurality of filter parameters, the dynamic filter.

3. The system of claim 1, wherein the dynamic filter is a first dynamic filter, and wherein the operation of applying the dynamic filter includes:
applying the first dynamic filter in a first time of the velocity model; and
applying a second, interpolated dynamic filter to a subsequent position and time value of the velocity model.

4. The system of claim 1, wherein the operation of applying the dynamic filter includes integrating the velocity model along a predefined integration path within the dynamic filter.

5. The system of claim 4, wherein the predefined integration path is determinable based on a shape of the dynamic filter.

6. The system of claim 1, wherein a shape of the dynamic filter is three-dimensional, and wherein a cross-section of the shape includes a cone, a conic section, a quadrilateral, or a composite shape.

7. The system of claim 1, wherein the velocity model is a three-dimensional velocity model, wherein the three-dimensional velocity model includes velocity data for seismic signals in the geological area of interest, wherein the operation of applying the dynamic filter to the velocity model includes using the dynamic filter to three-dimensionally integrate the three-dimensional velocity model for smoothing lateral anomalies, and wherein the operation of applying the velocity model to the seismic data includes applying the three-dimensional velocity model to the seismic data to convert the domain of the seismic data from a time domain to a depth domain.

8. A method comprising:
receiving a velocity model for a geological area of interest;
applying a dynamic filter to the velocity model for smoothing an anomaly included in the velocity model, wherein a shape of the dynamic filter is variable with respect to absolute depth; and
applying the velocity model with the smoothed anomaly to seismic data associated with the geological area of interest for converting a domain of the seismic data.

9. The method of claim 8, further comprising:
receiving a plurality of filter parameters; and
generating, based on the plurality of filter parameters, the dynamic filter.

10. The method of claim 9, wherein the filter parameters include time values, lateral extents, a maximum depth, and an integration weighting function.

11. The method of claim 8, wherein the dynamic filter is a first dynamic filter, and wherein applying the dynamic filter includes:
applying the first dynamic filter at a first time of the velocity model; and
applying a second, interpolated dynamic filter to a subsequent time and position value of the velocity model.

12. The method of claim 8, wherein applying the dynamic filter includes integrating the velocity model along a predefined integration weighting function within the dynamic filter, and wherein the predefined integration weighting function is determined based on a shape of the dynamic filter.

13. The method of claim 8, wherein a shape of the dynamic filter is three-dimensional, and wherein a cross-section of the shape includes a cone, a conic section, a quadrilateral, or a composite shape.

14. The method of claim 8, wherein the velocity model is a three-dimensional velocity model, wherein the three-dimensional velocity model includes velocity data for seismic signals in the geological area of interest, wherein applying the dynamic filter to the velocity model includes using the dynamic filter to three-dimensionally integrate the three-dimensional velocity model for smoothing the anomaly, and wherein applying the velocity model to the seismic data includes applying the three-dimensional velocity model to the seismic data to convert the domain of the seismic data from a time domain to a depth domain.

15. A non-transitory computer-readable medium comprising instructions that are executable by a processing device for causing the processing device to perform operations comprising:
receiving a velocity model for a geological area of interest;
applying a dynamic filter to the velocity model for smoothing an anomaly included in the velocity model, wherein a shape of the dynamic filter is variable with respect to absolute depth; and
applying the velocity model with the smoothed anomaly to seismic data associated with the geological area of interest for converting a domain of the seismic data.

16. The non-transitory computer-readable medium of claim 15, wherein the operations further comprise:
receiving a plurality of filter parameters that include an specific times, specific lateral extents, a maximum depth, and an integration weighting function; and generating, based on the plurality of filter parameters, the dynamic filter.

17. The non-transitory computer-readable medium of claim 15, wherein the dynamic filter is a first dynamic filter, and wherein the operation of applying the dynamic filter includes:
applying the first dynamic filter to a first time of the velocity model; and
applying a second, interpolated dynamic filter to a subsequent time and position value of the velocity model.

18. The non-transitory computer-readable medium of claim 15, wherein the operation of applying the dynamic filter includes integrating the velocity model along a predefined integration weighting function within the dynamic filter, and wherein the predefined integration weighting function is determined based on a shape of the dynamic filter.

19. The non-transitory computer-readable medium of claim 15, wherein a shape of the dynamic filter is three-dimensional, and wherein a cross-section of the shape includes a cone, a conic section, a quadrilateral, or a composite shape.

20. The non-transitory computer-readable medium of claim 15, wherein the velocity model is a three-dimensional velocity model, wherein the three-dimensional velocity model includes velocity data for seismic signals in the geological area of interest, wherein the operation of applying the dynamic filter to the velocity model includes using the dynamic filter to three-dimensionally integrate the three-dimensional velocity model for smoothing the anomaly, and wherein the operation of applying the velocity model to the seismic data includes applying the three-dimensional velocity model to the seismic data to convert the domain of the seismic data from a time domain to a depth domain.

* * * * *